United States Patent Office 3,794,498
Patented Feb. 26, 1974

3,794,498
DOUBLE PEAK SENSITIZATION OF SENSITIZING DYES FOR PHOTOGRAPHIC SILVER HALIDE EMULSIONS IN LIPOPHILIC SYSTEMS
Shi-Kuang Yao, Binghamton, N.Y., assignor to GAF Corporation, New York, N.Y.
Continuation of abandoned application Ser. No. 875,079, Nov. 10, 1969. This application Feb. 14, 1972, Ser. No. 226,211
Int. Cl. G03c 1/14
U.S. Cl. 96—124    46 Claims

ABSTRACT OF THE DISCLOSURE

The double peak sensitization of photographic emulsions by particular cyanine dyes is disclosed. The double peak sensitization is achieved by the use of a combination of compatible dyes. The combination includes a symmetrical carbocyanine dye derived from a benzimidazole which carries in the 5-position a trifluoromethyl group and is substittued on one of the nitrogen atoms by a lower alkyl carboxy group or by a sulfoalkyl group. The second dye in the combination is selected from one of two groups. The first group of dyes are the selena-pseudocyanines. The second group of dyes are carbocyanines in which one of the nuclei is a benzimidazole and the other a benzothiazole or a benzoxazole.

---

Figure 1:
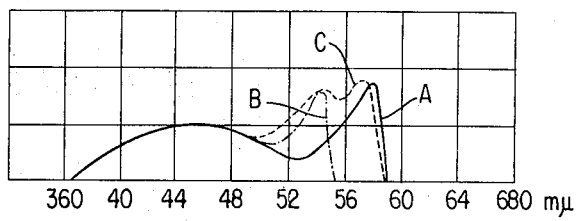

This is a continuation of application Ser. No. 875,079, filed Nov. 10, 1969, now abandoned.

This invention relates to photographic silver halide emulsions and, more particularly, to dye sensitized photographic silver halide emulsions.

Photographic silver halide emulsions, as is well known, are naturally sensitive to light. The sensitivity of silver halides, however, is normally limited to a narrow range of wave lengths at the low end of the spectrum, corresponding to the blue and/or ultraviolet range.

It has long been known that certain types of dyes can be incorporated into the emulsion in order to sensitize the same to other wave lengths of light. This procedure is a decided improvement over plain silver halide emulsions. A later development in the art of sensitization of photographic emulsions was the inclusion of another substance as a so-called "supersensitizer." The effect of a supersensitizer, which does not itself necessarily have to be a sensitizer, is to make the emulsion more sensitive to a particular wave length than could be accounted for by the sum effect of the separate additives. This is, in effect, a synergistic phenomenon.

It has been found with sensitizing dyes that the sensitization effect produced by a given dye varies somewhat with the type of emulsion in which the dye is incorporated. Furthermore, if the emulsion conditions are changed the sensitization imparted by a particular dye will change. Such a change in the emulsion conditions could include, for example, the addition of another dye. It is commonly found that when two sensitizing dyes are mixed together in an emulsion they are not compatible to the extent that they exhibit their own characteristic sensitization without being effected by the other. This is especially true when each of the dyes sensitizes the emulsion in the same spectral region as the other.

It is, therefore, a primary object of the present invention to provide a photographic silver halide emulsion which is sensitized by a combination of dyes and is free of the foregoing and other such disadvantages.

It is another object of the present invention to provide a method of sensitizing photographic silver halide emulsions by the addition of a combination of sensitizing dyes which are compatible each with the other and which exhibit their own characteristic sensitization.

It is yet another object of the present invention to provide a photographic silver halide emulsion having a combination of sensitizing dyes which act in the same spectral region and which exhibit their own characteristic sensitization.

A further object of the present invention is to provide a combination of sensitizing dyes for a photographic silver halide emulsion which dyes individually are useful to sensitize in lipophilic systems and which exhibit their own characteristic sensitization without being effected by each other.

These and other objects of the present invention will become apparent by reference to the following detailed description thereof.

In accordance with the objects of the present invention there are provided a combination of dyes for the double peak sensitization of photographic silver halide emulsions which combination includes a carbocyanine dye derived from a benzimidazole which carries in the 5-position a trifluoromethyl group and is substituted on a nitrogen atom by a lower alkyl carboxy group or by a lower sulfoalkyl group. The second dye of the combination is either a selena-pseudocyanine or a carbocyanine with a benzimidazole nucleus and a benzothiazole or a benzoxazole group thereon.

In general, the symmetrical carbocyanine dye derived from a benzimidazole which carries in the 5-position a trifluoromethyl group and is substituted on one of the nitrogen atoms by a lower alkyl carboxy group or by a sulfoalkyl group is represented by the general formula:

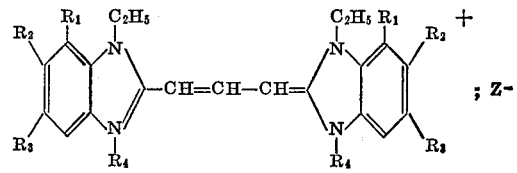

wherein $R_1$ and $R_2$ each represents a hydrogen, alkyl, alkoxy, halogen, carboxyalkyl, cyano or the combination of those groups; $R_3$ represents a trifluoromethyl group; $R_4$ represents a carboxyalkyl or sulfoalkyl group; and $Z^-$ represents the appropriate anion corresponding to $R_4$.

In general, the selena-pseudocyanine dyes can be represented by the formula:

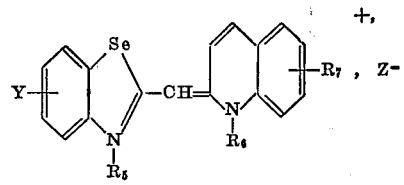

wherein $R_5$ represents a carboxyalkyl or sulfoalkyl group; $R_6$ represents an alkyl or aralkyl group; $R_7$ represents a hyodrgen, alkyl, or alkoxy group Y represents a halogen or alkyl group; and $Z^-$ represents the appropriate anion corresponding to $R_5$.

The carbocyanine dye in which one of the nuclei is a benzimidazole and the other a benzothiazole or a benzoxazole can be represented by the general formula:

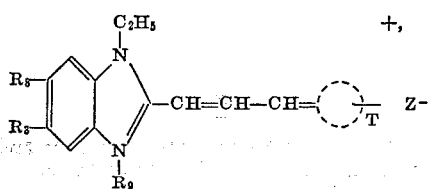

wherein T represents the following radicals

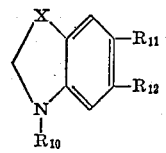

and

and wherein $R_8$ represents hydrogen, halogen, or cyano; $R_9$ represents sulfoalkyl; $R_{10}$ represents hydrogen or lower alkyl; $R_{11}$ and $R_{12}$ each represents hydrogen, halogen, or lower alkyl; $R_3$ and $Z^-$ are as defined above, and X represents oxygen or sulfur.

According to the instant invention the subject compounds disclosed above are prepared from a starting material having the following formula:

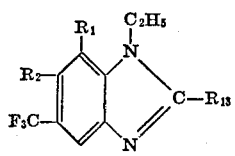

wherein $R_1$ and $R_2$ are defined above and $R_{13}$ represents an alkyl radical. The compounds represented by the above formula are prepared in general by the reaction of a halonitrobenzotrifluoride with ethylamine, a catalyst and hydrazine so as to form the desired product. That is to say that the compounds represented by the above formula may in general be prepared according to the following reaction scheme:

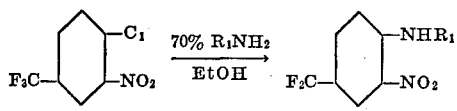

4-chloro-3-nitrobenzo-trifluoride may be reacted with an appropriate alkyl or aryl amine so as to form the appropriate N-substituted 4-trifluoromethyl - 2 - nitro-aniline derivative. This nitro aniline derivative may then be reacted with an appropriate catalyst in a solvent system and, subsequently treated with acid anhydride to form the desired 1,2-di-substituted-5-trifluoromethyl benzimidazole according to the following equations:

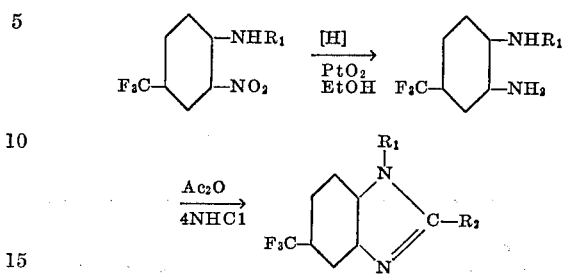

The free-base, i.e., 1,2-di-substituted 5-trifluoromethyl-benzimidazole may then be nitrated, reduced, and reacted by means of Sandmeyer's reaction so as to form the appropriate haloderivative according to the following equations:

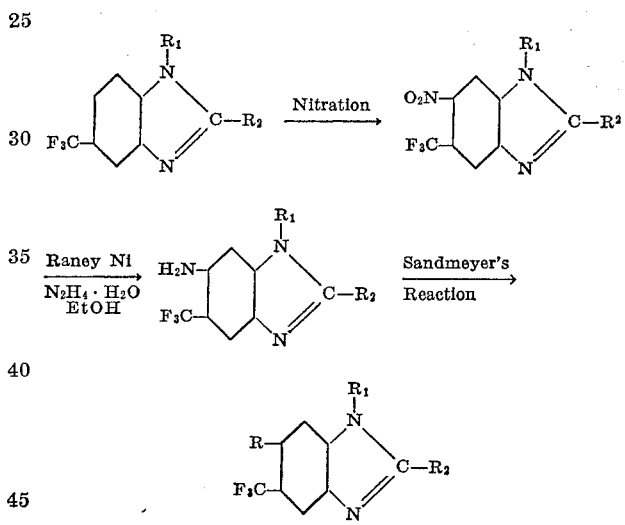

The above reactions may be advantageously carried out in the presence of an inert solvent such as a lower alkanol such as, for example, methanol, ethanol, isopropanol, etc., or in the presence of aromatic organic solvents such as dioxane, benzene, toluene, etc. In general, the above reactions may be carried out at temperatures ranging from about 20 degrees centigrade to about 150 degrees centigrade and, preferably, in the range from about 30 degrees centigrade to 100 degrees centigrade, by reacting appropriate amounts each of the individual ingredients.

The desired end products may be isolated from the reaction mixture by conventional means such as, for example, by dilution of said reaction mixture with water followed by the adjustment of the pH of the solution and the isolation of the precipitate or solid so formed. The compound may be further purified by procedures such as, for example, re-crystallization.

The catalyst which may be suitably employed in connection with the instant invention and in particular the catalysts which may be employed for the reduction of n-alkyl-4-trifluoromethyl - 2 - nitroaniline include platinum, palladium and nickel catalysts such as the oxides or the catalytically reactive combinations of said metals.

The specific halogen derivative produced, i.e., chloro-, bromo- or fluoro-derivative is determined by the materials employed in the Sandmeyer reaction. As is well known in the art, the Sandmeyer reaction is one in which a diazonium group is an aromatic compound is replaced by halogen radicals under the catalytic influence of the copper salts. Therefore, if one employs copper chloride one would obtain the corresponding chloro-derivative as a result of this reaction. In a similar manner, one may employ copper bromide, copper iodide and the like. In addition, the halogenation may also take place by the reaction of the corresponding diazonium with cuprous or cupric salt catalyst.

The sulfopropyl-benzimidazolium salt of the above compound is prepared by reaction of the benzimidazole base with 1,3-propane sultone. The reaction product, i.e., the 3-sulfopropyl-benzimidazolium salt can be separated from the above reaction mixture by conventional means such as extraction with acetone and ether.

The substituted symmetrical benzimidazole carbocyanine dyes forming a part of the present invention can then be prepared by heating the 3-sulfopropyl-benzimidazolium salt in a solution of sodium and absolute ethanol. The mixture is heated to reflux and 2,2,2-trichloro-1-ethoxyethanol is added, portionwise. The reaction mixture is refluxed for thirty minutes after which it is diluted with water, filtered and purified from methanol.

The benzimida-thiazolino-carbocyanines of the present invention can be prepared by reaction of the 3-sulfopropyl-benzimidazolium salt with 2-anilinovinyl-3-alkyl-thiazolinium iodide in a solvent such as pyridine. The reaction mixture is heated to a constant temperature of from about 100 to 150° C. subsequent to which acetic anhydride is added to the mixture. Triethylamine is then added to the mixture and the reaction is refluxed for approximately two hours. The reaction mixture is then cooled and the desired benzimide-thiazolino-carbocyanine is extracted by conventional means such as solvent extraction.

The desired benzimida-oxa-carbocyanines can be prepared by the reaction of the 3-sulfopropylbenzimidazolium salt with 2 - acetanilinovinyl - 3-alkyl-benzoxazolium salt under the conditions described in connection with the reaction for the formation of benzimida-thiazolino-carbocyanine.

The selena-pseudocyanines of the present invention are prepared from the corresponding substituted 2-aminophenyl or 2-nitrophenyl diselenide. The corresponding diselenide is reacted in a system whereby reduction and ring closure is affected in the presence of acetic acid, acetic anhydride, and zinc dust. The carboxyalkyl or sulfopropyl group is attached to the 3-position in a known manner. The thus prepared substituted-2-carboxyalkyl or 3-sulfopropyl-2-methylbenzoselenazolium salt is reacted with an equal molar amount of the substituted 2-ethylmercaptoquinolinium salt corresponding to the desired quinoline moiety of the selena-pseudocyanine. The reaction is conducted in isopropanol with an amine such as triethylamine present. The mixture is heated on a steam bath and cooled. The dye is then separated and purified by known means.

The combination of dyes of the present invention provides a double peak sensitization of photographic silver halide emulsions in lipophilic systems when incorporated therein. It is especially useful in color emulsions whose very nature, because of the color formers dispersed therein, is normally hard to sensitize. The combination of dyes of the present invention finds great use as sensitizers in the magenta layer of color emulsions. Although this new combination of dyes is useful for sensitizing the customarily employed gelatin silver chloride, silver chlorobromide, silver bromide, silver bromo-iodide, and silver chloro-bromo-iodide emulsions, photographic emulsions containing other water permeable colloids such as agar-agar, zeine, collodian, water-soluble cellulose derivatives, polyvinyl alcohol or other hydrophilic synthetic or natural resins or polymeric compounds, may equally well as sensitized according to this invention.

To prepare photographic emulsions sensitized according to the present invention with the combination of dyes, the compounds can be incorporated in the photographic emulsion by one of the methods customarily employed in the art. In practice, it is convenient to add the dyes to the emulsion in the form of a solution in an appropriate solvent. The dyes are advantageously incorporated in the finished, washed emulsions and should be uniformly distributed throughout the emulsion. The concentration of the dye salts in the emulsion can vary widely, for example, from 1 to 100 mg. per kg. of flowable emulsion and will vary according to the effect desired. The suitable and most economical concentration for any given emulsion will be apparent to those skilled in the art, upon making the ordinary tests and observations customarily used in the art of emulsion-making.

The new combination of dyes can be incorporated into photographic emulsions the general sensitivity of which has been increased by physical and chemical ripening. As suitable chemical sensitizers may be mentioned the well-known sulphur sensitizers such as allylisothiocyanate, allylthiourea, sodium thiosulphate, potassium selecocyanide and the natural sensitizers originating in the gelatin, reducing sensitizers such as the imino-aminomethane sulphinic acid and the derivatives thereof, and the salts of noble metals such as gold, platinum and palladium.

The photographic emulsions optically sensitized according to the invention may further be supersensitized and/or hypersensitized by one of the methods known to those skilled in the art.

In preparing the photographic emulsions according to the invention, the usual and suitable addenda such as antifogging agents, stabilizers, antibronzing agents, hardeners, wetting agents, plasticizers, development accelerators, color couplers, fluorescent brighteners and ultraviolet screening compounds can moreover be incorporated in the emulsion in the manner customarily employed in the art In this respect it may be maintained that the sensitivity of the silver halide emulsions sensitized according to the process of the present invention is not adversely affected but rather enhanced by the presence therein of certain fluorescent compounds. Another advantage of the process for sensitizing silver halide emulsions according to the present invention is the compatibility of the novel combination of dyes with anionic wetting agents and with color couplers, which is of great importance in the application of the compounds for sensitizing the silver halide emulsions of a light-sensitive element for color photography.

It is especially to be noted that the dyestuffs of the instant invention are particularly useful in connection with silver halide emulsions in lipophilic systems wherein said dyestuffs have been found to exhibit very strong second-order sensitization. It is believed because of the nature of color emulsions especially those incorporating color formers dispersed in non-ionic media, that it is very hard to sensitize the same. Therefore, this response as noted above in lipophilic systems makes the compounds of the instant invention even more useful as sensitizers in the magneta layer of color emulsions.

Emulsions sensitized with the compounds of the instant invention can be coated in the usual manner on a suitable support such as glass, cellulose, derivative film, resin film, or paper.

The instant invention will now be illustrated by the following more detailed examples, it is to be noted, however, that the instant invention is not deemed as being limited thereto:

EXAMPLE 1

This example is directed to the preparation of N-ethyl-4-trifluoromethyl-2-nitroaniline. 194.3 grams (0.865 mole) of 4-chloro-3-nitrobenzotrifluoride were added dropwise into 156 grams (3.46 moles) of 70% ethylamine with stirring. After the addition of ethylamine, the reaction mixture was stirred for 30 minutes before it was heated on a steam bath for an additional hour. The mixture was then poured into two volumes of ice water, filtered after 20 minutes of standing and washed well with water. The yellow solid was recrystallized from aqueous ethyl alcohol. There was obtained 163.2 grams (79.3% yield) of N-ethyl-4-trifluoromethyl-2-nitroaniline as orange plates melted at 59–60° C. As a result of this reaction the N-ethyl-4-trifluoromethyl-2-nitroaniline was formed.

EXAMPLE 2

This example is directed to the preparation of N-ethyl-4-trifluoromethyl-o-phenylene-diamine. 70.2 g. (0.3 mole) of N-ethyl-4-trifluoromethyl-2-nitroaniline as prepared in Example 1 in 900 ml. of 95% ethyl alcohol were mixed with 6.0 g. of Pd–C in a 1-liter 3-necked round-bottom flask equipped with a long bulb-type condenser, mechanical stirrer and dropping funnel. There was added dropwise (cautiously) 180 ml. of 85% hydrazine hydrate and the reaction mixture was then heated on a steam bath with stirring for 2 hours. The mixture was filtered hot and the filtrate was poured into 3.0 l. of water. The white solid was filtered after cooling, washed with water and air-dried. There was obtained 54.32 g. (88.7% yield) of N-ethyl-4-trifluoromethyl-o-phenylene-diamine as light tan powder melting at 75–77° C. A 7% loss would have to take on the purification of the crude product with aqueous ethanol and charcoal as tannish white powder melting at 75–77° C. As a result of this reaction the N-ethyl-4-trifluoromethyl-o-phenylene-diamine was formed.

EXAMPLE 3

This example is directed to the preparation of 1-ethyl-5 - trifluoromethyl-2-methylbenzimidazole. 46.80 g. (0.2 mole) of N-ethyl-4-trifluoromethyl-2-nitroaniline in 200 ml. of benzene were hydrogenated on 6.00 g. of Pd–C until there was no more hydrogen absorbed (approximately one hour). The catalyst was filtered off and the filtrate was transferred to a 1-liter 3-necked round-bottom flask equipped with a mechanical stirrer, condenser and dropping funnel. There was added portionwise 34.8 ml. of acetic anhydride and the mixture was heated on a steam bath for 20 minutes. 84 ml. of 4 N hydrochloric acid were added cautiously in portions and the reaction mixture was refluxed for 1½ hours (efficient stirring was necessary). The aqueous layer (bottom layer) was separated in a separatory funnel and the benzene layer was washed with water. The benzene layer was discarded and the combined aqueous layers were neutralized with 26% ammonium hydroxide. The solid after it cooled was filtered, washed well with water and dried in a 90° C. oven for 3 hours. There was obtained 41.31 g. (90.7% yield) of 1-ethyl-5-trifluoromethyl - 2 - methylbenzimidazole as light tan solid melted at 96–98° C. As a result of this reaction the 1 - ethyl-5-trifluoromethyl-2-methylbenzimidazole was formed.

EXAMPLE 4

The 1 - ethyl - 5 - trifluoromethyl - 2 - methylbenzimidazole of Example 3 was reacted with 1,3-propane sultone to form the 3-sulfopropylbenzimidazolium salt. 10 millimole of the 1 - ethyl - 5-trifluoromethyl-2-methylbenzimidazole was reacted with 11 millimols of the 1,3-propane sultone, and the reaction mixture was heated to a constant temperature of approximately 114° C. for 50 minutes. The reaction mixture was cooled and triturated with acetone and ether mixture (1:3) twice and ether twice. The reaction resulted in 1-ethyl-5-trifluoromethyl-3-sulfopropyl-2-methylbenzimidazolium salt.

EXAMPLE 5

The procedure of Example 4 was repeated using as a starting material, in lieu of 1-ethyl-5-trifluoromethyl-2-methylbenzimidazole, 6 - chloro - 1-ethyl-5-trifluoromethyl - 2 - methylbenzimidazole, 6-cyano-1-ethyl-5-trifluoromethyl - 2 - methylbenzimidazole, 6-bromo-1-ethyl-5-trifluoromethyl - 2 - methylbenzimidazole, respectively. To form the corresponding 3-sulfopropylbenzimidazolium salt thereof.

Some of the characteristics of the resulting benzimidazolium salts are presented in Table 1.

TABLE 1

| Benzimidazolium salts | Yield, percent | M.P., ° C. |
|---|---|---|
| I. 6-chloro-1-ethyl-5-trifluoromethyl-3-sulfopropyl-2-methylbenzimidasolium salt | 97.1 | 1 317 |
| II. 6-bromo-1-ethyl-5-trifluoromethyl-3-sulfopropyl-2-methylbenzimidasolium salt | 97.1 | 294–95 |
| III. 1-ethyl-5-trifluoromethyl-3-sulfopropyl-2-methylbenzimidazolium salt | 97.1 | 305–306.5 |

[1] With decomposition.

EXAMPLE 6

6 millimols of 1-ethyl-5-trifluoromethyl-3-carboxyethyl-2-methylbenzimidazolium iodide were dissolved in a solution of 18.2 millimols of sodium and 60 milliliters of absolute ethanol. The mixture was heated to reflux, and there was then added portionwise 6.2 millimols of 2,2,2-trichloro-1-ethoxyethanol and the mixture was refluxed on a steam bath for 30 minutes. The reaction mixture was then diluted with water, filtered and purified from methanol.

EXAMPLE 7

The procedure of Example 6 was repeated using, instead of 1 - ethyl - 5 - trifluoromethyl-3-carboxyethyl-2-methylbenzimidazolium iodide, 6-chloro-1-ethyl-5-trifluoromethyl-3-carboxyethyl-2-methylbenzimidazolium iodide.

EXAMPLE 8

The procedure of Example 6 was again repeated using as the starting material 6-bromo-1-ethyl-5-trifluoromethyl-3 - carboxyethyl - 2 - methylbenzimidazolium iodide.

EXAMPLE 9

The 1 - ethyl - 5 - trifluoromethyl - 3 - sulfopropyl-2-methylbenzimidazolium salt as prepared in Example 4. 6 millimols of the product of Example 4 were disolved in a solution of 18.2 millimols of sodium and 60 milliliters of absolute ethanol. The mixture was heated to reflux and 6.2 millimols of 2,2,2-trichloro-1-ethoxyethanol were added portionwise. The mixture was refluxed on a steam bath for 30 minutes. The reaction mixture was then diluted with water, filtered and purified from methanol.

EXAMPLE 10

The procedure of Example 9 was repeated using as the starting material the 6-chloro-1-ethyl-5-trifluoromethyl-3-sulfopropyl-2-methylbenzimidazolium salt prepared in Example 5.

EXAMPLE 11

The procedure of Example 9 was reepated using as the starting material the 6-bromo-1-ethyl-5-trifluoromethyl-3-sulfopropyl-2-methylbenzimidazolium salt prepared in Example 5.

The structures and sensitizing characteristics of the dyes of Examples 6 through 11 are presented in Table 2. These dyes have been tested extensively in diffeernt in available emulsions. They all showed unique response in second-order sensitization. It has been found, however, that the sensitization response by these dyes in color emulsions in lipophilic systems as well as hydrophilic systems creates a sensitization gap between 480 and 500 mu even though the speed is quite adequate. This gap is eliminated by the unique combination of dyes according to the present invention.

TABLE 2.—BENZIMIDAZOLIUM SALTS

| Ex. No. | R₁ | R₂ | R₃ | R₄ | Z⁻ | Carbocyanines | λmax. (MeOH), nm. |
|---|---|---|---|---|---|---|---|
| 6 | H | H | CF₃ | C₂H₄CO₂H | I⁻ | W—CH=CH—CH=W',Z | 504 |
| 7 | H | Cl | CF₃ | C₂H₄CO₂H | I⁻ | W—CH=CH—CH=W',Z | 512 |
| 8 | H | Br | CF₃ | C₂H₄CO₂H | I⁻ | W—CH=CH—CH=W',Z | 514 |
| 9 | H | H | CF₃ | C₃H₆SO₃ | ...... | W—CH=CH—CH=W',Z | 505 |
| 10 | H | Cl | CF₃ | C₂H₆SO₃ | ...... | W—CH=CH—CH=W',Z | 513 |
| 11 | H | Br | CF₃ | C₃H₆SO₃ | ...... | W—CH=CH—CH=W',Z | 513 |

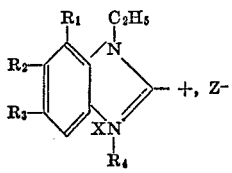

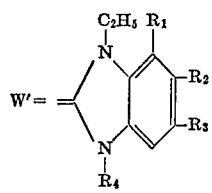

EXAMPLE 12

The preparation of bis-(6-methyl 2-amino phenyl)-diselenide. A solution of 75.45 grams of 6-methyl-2-nitrophenyl selenocyanate in 700 grams of 95% ethyl alcohol were heated under refluxing. There was added 180 grams of 85% hydrazine hydrate dropwise with caution, and was refluxed for 3 hours. The reaction mixture was poured into 4 liters of ice-water, was neutralized with an acetic acid to pH 7 and was kept in a cool room for overnight. The resulting yellow solid was filtered, was washed well with water and was dried. There was obtained 55 grams of bis(6-methyl-2-amino-phenyl)-diselenide as yellow powder. The yield of said product was 95%. A portion of the product was recrystallized from EtOH and H₂O, melting at 132–34° C. This was mixed with a known compound, prepared according to Keimatu & Satoda, Chem. Abs., vol. 33, p. 154⁸, 1939 showed no depression on mixed melting point.

EXAMPLE 13

The preparation of bis(5-methyl-2-amino-phenyl)-diselenide. A solution of 40 grams of 5-methyl-2-amino-phenyl-selenocyanate in 500 grams of 95% ethyl alcohol were heated under refluxing. There was added 96 grams of 85% hydrazine hydrate dropwise with caution and refluxed for 3½ hours. The reaction mixture was poured into 1 liter of ice-water, was neutralized with 6 N acetic acid to pH 7 and was left at room temperature for overnight. The resulting yellow solid was filtered, washed well with water and dried. There was obtained 28.03 grams of bis-(5-methyl-2-amino-phenyl)-diselenide as yellow powder. The yield of said product was 91.4%. A portion of the product was recrystallized from CH₃OH melting at 85–7° C.

*Analysis.*—Calcd. for C₁₄H₁₆N₂Se₂ (percent): N, 7.75. Found (percent): N, 8.11.

EXAMPLE 14

The preparation of bis-(5-chloro-2-nitrophenyl)-diselenide. 2.76 grams (0.12 mole) of sodium were dissolved in 140 ml. of liquid ammonia. 9.48 grams (0.12 mole) of selenium were added portion-wise with stirring for 20 minutes until a dark green homogeneous solution of sodium diselenide was formed. There was added portionwise 23.04 grams (0.12 mole) of 2,4-dichloro-nitrobenzene. The reaction mixture was stirred for one hour and then the stirring was continued at room temperature until most of the ammonia was evaporated. An equal amount of water was added before the end of the stirring. The mixture was filtered, and the solid material was ground well with water, filtered, washed well with 95% ethyl alcohol, and air-dried. There as obtained 14.1 grams (49.6%) of bis-(5-chloro-2-nitrophenyl)diselenide melted at 133–37° C. A portion of the above compound was purified from benzene melted at 146–7° C.

EXAMPLE 15

The preparation of 2,7-dimethyl-benzoselenazole. 17.40 grams (0.047 mole) of bis-(6-methyl-2-amino-phenyl)-diselenide prepared in Example 12, were dissolved in a mixture of 115 grams of glacial acetic acid and 28 grams of acetic anhydride and was heated under refluxing. There was added gradually 10 grams of zinc dust at such a rate that the solution was boiled gently. 22 grams of acetyl chloride were added after the solution became discolored. The reaction mixture then was heated on a steam bath for 2 hours. The white needles were formed during heating. After cooling, the needles were filtered, and heated with 70 grams of 26% ammonium hydroxide and 70 grams of water on a steam-bath for 30 minutes. The resulting mixture, after cooled, was filtered, washed well with water and air-dried. There was obtained 9.28 grams (0.045 mole) of 2,7-dimethyl benzoselenazole as pale yellow solid melting at 35–6° C. The yield of the product was 47.2%. A portion of the above product was purified by sublimation under reduced pressure as white crystalline form melting at 38–38.5° C.

*Analysis.*—Calcd. for C₉N₉NSe (percent): C, 51.44; H, 4.32; N, 6.67; Se, 37.57. Found (percent): C, 51.36; H, 4.36; N, 6.57; Se, 37.78.

EXAMPLE 16

The preparation of 2,6-dimethyl-benzoselenazole. 22.15 grams (0.060 mole) of bis-(5-methyl-2-amino-phenyl)-diselenide prepared in Example 13, were dissolved in a mixture of 90 grams of glacial acetic acid and 33 grams of acetic anhydride and was heated under gentle refluxing. There was added portionwise 14 grams of zinc dust at such a rate that the solution was boiled gently. 28 grams of acetyl chloride were added after the solution became discolored. The reaction mixture was then heated on a steam bath for 2 hours, and was poured into 1 liter of ice-water. After the solution was cooled to room temperature, it was neutralized with 26% NH₄OH and was cooled again. The mixture was extracted with methylene chloride, and dried over potassium carbonate. After the evaporation of methylene chloride, it was distilled in vacuo. There was obtained 6.90 grams (0.033 mole) of 2,6-dimethyl benzoselenazole as pale yellow oil boiling at 83° C. at 0.7 mm. pressure. The yield of said product was 26.4%.

*Analysis.*—Calcd. for C₉H₉NSe (percent): C, 51.44; H, 4.32; N, 6.67. Found (percent): C, 51.43; H, 4.30; N, 6.33.

EXAMPLE 17

The preparation of 6-chloro-2-methylbenzoselenazole. 56.7 grams (0.12 mole) of bis-(5-chloro-2-nitrophenyl)diselenide prepared in Example 14 were added to a solution of 800 grams of acetic acid and 70 grams of acetic anhydride. There was added 90 grams of zinc dust portionwise at such a rate that the solution was boiled gently. The mixture was continuously heated on a steam bath for an additional 30 minutes after the addition of zinc dust, until the solution of the mixture was changed from deep brown to colorless. 35 grams of acetyl chloride were added dropwise and the mixture was then heated for one hour. The reaction mixture was filtered hot, the filtrate was poured into two volumes of water and neutralized with 26% ammonium hydroxide. After standing for over night, the solid material was filtered, washed with water and air-dried. The solid was then repeatedly extracted with petroleum ether (B.P. 30–60° C). After the evaporation of ether, there was obtained 18.93 grams (34.3% yield) of 6-chloro-2-methylbenzoselenazole as white needles melted at 83–5° C. A portion of the above base was recrystallized from petroleum ether and decolorized giving M.P. 85–7° C.

*Analysis.*—Calcd. for $C_8H_6ClNSe$ (percent): C, 41.68; H, 2.62; N, 6.08. Found (percent): C, 41.79 and 41.80; H, 3.07 and 2.99; N, 5.68 and 5.86. Picrate: yellow needles with M.P. 159–64° C. (from methanol) Anal. Calcd. for $C_{14}H_9ClN_4O_7Se$: N, 12.19; Found 12.23 and 12.06

As can be seen, the preparation of the diselenide can be performed by one of several known procedures. By varying the starting materials one can determine the final selena-pseudocyanine product. As can be seen from Examples 15, 16 and 17, the corresponding diselenide is reduced and the ring closure is effected in the system comprising acetic acid, acetic anhydride and zinc dust. It is also seen in Examples 15 and 16 that acetyl chloride can be used in conjunction with that system. The substituted benzoselenazole can then be sulfopropylated or carboxyalkylated in a known manner.

The selena-pseudocyanine dyes of Examples 19 through 39 are prepared by the general procedure set forth in Example 18.

EXAMPLE 18

General preparation of the selena-pseudocyanines. 1 mmole of substituted 2-methylbenzoselenazolium bromide and 1 mmole of substituted 2-ethylmercaptoquinolinium iodide are mixed with 6 ml. of isopropyl alcohol. There is added 30 drops of triethylamine and the mixture is heated on a steam-bath for 3 minutes. After it cools, it is centrifuged and the dye is boiled repeatedly twice again with isopropyl alcohol and purified from pyridine and water.

TABLE 3

| Ex. No. | Y | $R_5$ | Z- | Selena-pseudocyanines | λmax. (MeOH), nm. |
|---|---|---|---|---|---|
| 19 | 5-Cl | $CH_2COOH$ | Br- | A—CH=B,I- | 501 |
| 20 | 5-Cl | $CH_2COOH$ | Br- | A—CH=B,I- | 495 |
| 21 | 5-Cl | $CH_4COOH$ | I- | A—CH=C,I- | 506 |
| 22 | 5-Cl | $C_2H_4COOH$ | I- | A—CH=E,I- | 496 |
| 23 | 5-Cl | $C_2H_4COOH$ | I- | A—CH=D,I- | 496 |
| 24 | 5-Cl | $C_3H_6SO_3$ | | A—CH=D,- | 494 |
| 25 | 5-Cl | $C_3H_6SO_3$ | | A—CH=C,I- | 506 |
| 26 | 6-Cl | $C_3H_6SO_3$ | | A—CH=D,- | 492 |
| 27 | 6-Cl | $C_3H_6SO_3$ | | A—CH=C,- | 507 |
| 28 | 6-Cl | $C_2H_4COOH$ | | A—CH=D,I- | 496 |
| 29 | 6-Cl | $C_2H_4COOH$ | I- | A—CH=B,I- | 502 |
| 30 | 6-$CH_3$ | $C_2H_4COOH$ | I- | A—CH=C,I- | 510 |
| 31 | 6-$CH_3$ | $C_3H_6SO_3$ | | A—CH=B,- | 506 |
| 32 | 6-$CH_3$ | $C_3H_6SO_3$ | | A—CH=D,- | 500 |
| 33 | 6-$CH_3$ | $C_3H_6SO_3$ | | A—CH=C,- | 512 |
| 34 | 7-$CH_3$ | $C_3H_6SO_3$ | | A—CH=D,- | 496 |
| 35 | 7-$CH_3$ | $C_3H_6SO_3$ | | A—CH=B,- | 503 |
| 36 | 7-$CH_3$ | $C_3H_6SO_3$ | | A—CH=C,- | 508 |
| 37 | 7-$CH_3$ | $CH_2COOH$ | Br- | A—CH=C,- | 510 |
| 38 | 7-$CH_3$ | $C_2H_4COOH$ | I- | A—CH=D,I- | 498 |
| 39 | ϵ-$CH_3$ | $C_2H_4COOH$ | I- | A—CH=D,I- | 501 |

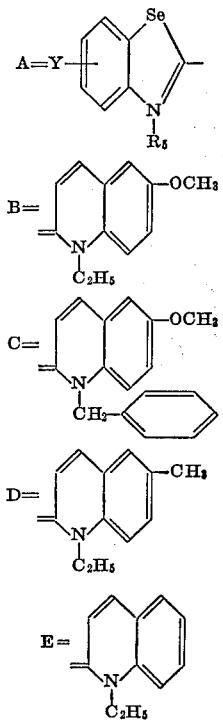

EXAMPLE 40

2 millimols of 6 - chloro-1-ethyl-5-trifluoromethyl-3-sulfopropyl-2-methylbenzimidazolium salt was reacted with 1.75 millimols of 2-anilinovinyl-3-ethylthiazolium iodide in 4 ml. of pyridine. The reaction mixture was heated to reflux in a constant temperature bath at a temperature approximately 131° C. To the reaction mixture there was added 0.4 ml. of acetic anhydride and the mixture was heated for a period of approximately 1 minute prior to the addition of 0.8 ml. of triethylamine. The reaction mixture was refluxed for 2 hours. After cooling, the reaction mixture was diluted with ether and the dye was boiled twice with isopropyl alcohol. Subsequent to the boiling treatment a carbocyanine having the formula

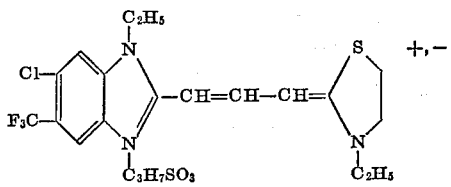

by solvent recrystallization with methyl Cellosolve.

EXAMPLE 41

The procedure of Example 40 was repeated with the exception that 2-anilinovinyl-3-methylthiazolinium iodide was employed in lieu of 2-anilinovinyl-3-ethyl-thiazolinium iodide. In addition, methyl alcohol was employed in lieu of methyl Cellosolve during the solvent recrystallization to form a product having the formula:

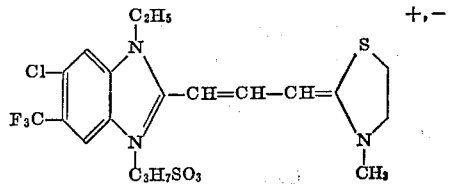

EXAMPLE 42

The procedure of Example 40 was repeated with the exception that in lieu of 2 - anilinovinyl-3-ethylthiazolinium iodide, 2-acetanilinovinyl - 3 - methylbenzoxazoliumiodide was reacted. Upon purification with methyl Cellosolve, a compound having the formula:

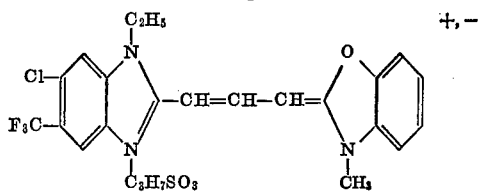

was recrystallized.

EXAMPLE 43

The procedure of Example 42 was repeated with the exception that instead of 2-acetanilinvinyl-3-methylbenzoxazolium iodide, 2 - acetanilinovinyl-3-ethyl-5,6-dimethylbenzoxazolium iodide was employed. The compound having the formula:

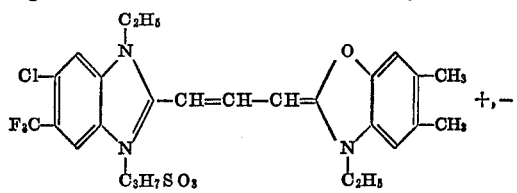

was recrystallized from methanol.

EXAMPLE 44

2 mmols of 1-ethyl-5-trifluoromethyl-3-sulfopropyl - 2-methylbenzimidazolium salt and 1.75 millimols of 2-acetanilinovinyl-3-ethyl-benzoxazolium iodide were reacted as in Example 40. Upon recrystallization from pyridine and water a compound having the formula

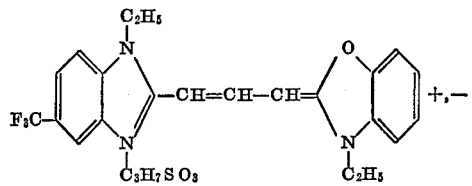

was recovered.

EXAMPLE 45

The procedure of Example 44 was repeated with the exception that in lieu of 2-acetanilinovinyl-3-ethylbenzoxazolium iodide, 2-acetanilinovinyl-3-methylbenzoxazolium iodide was employed. Upon recrystallization from isopropyl alcohol a compound having the formula:

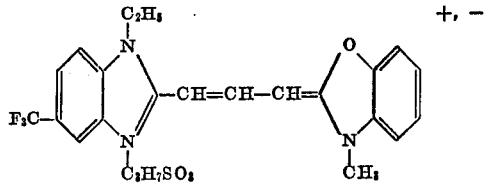

was recovered.

EXAMPLE 46

The procedure of Example 44 was repeated with the exception that in lieu of 2-acetanilinovinyl-3-methylbenzoxazolium salt, 2-acetanilinovinyl-6-chloro - 3 - methylbenzoxazolium iodide was employed. Upon recrystallization from methyl Cellosolve, a compound having the formula:

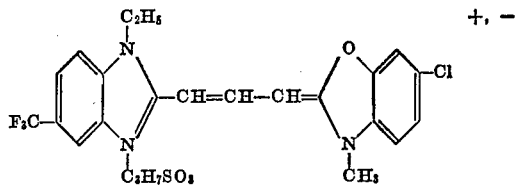

was recovered.

EXAMPLE 47

Two millimols of 6-cyano-1-ethyl-5-trifluoromethyl-3-sulfopropyl-2-methylbenzimidazolium salt and 1.75 millimols of 2-anilinovinyl-3-methyl thiazolinium iodide were reacted in Example 40. Upon recrystallization from methanol and water, a compound having the formula

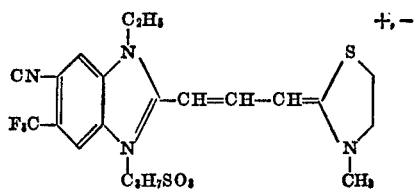

was recovered.

EXAMPLE 48

The procedure of Example 47 was repeated with the exception that in lieu of 2-anilinovinyl-3-methyl-thiazolinium iodide, 2-acetanilinovinyl - 3 - methylbenzoxazolium iodide was employed. Upon recrystallization from methyl Cellosolve and water a compound having the formula

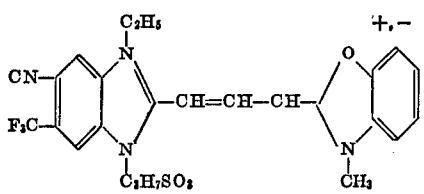

was recovered.

EXAMPLE 49

Two millimols of 6-bromo-1-ethyl-5-trifluoromethyl-3-sulfopropyl-2-methylbenzimidazolium salt was reacted with 1.75 mmols of 2-anilinovinyl - 3 - ethyl-thiazolinium iodide as in Example 47. Upon recrystallization from pyridine a compound having the formula

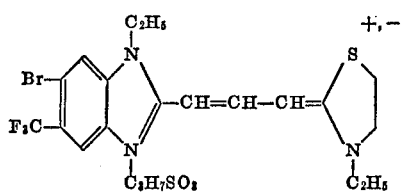

was recovered.

EXAMPLE 50

The procedure of Example 49 was repeated with the exception that in lieu of 2-anilinovinyl-3-ethyl-thiazolinium iodide, 2-anilinovinyl-3-methyl-thiazolinium iodide was employed. Upon recrystallization from methyl Cellosolve a compound having the formula

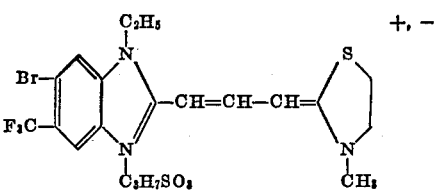

was recovered.

EXAMPLE 51

The procedure of Example 49 was repeated with the exception that in lieu of 2-anilinovinyl-3-ethyl-thiazolinium iodide, 2-acetanilinovinyl - 3 - methylbenzoxazolium iodide was employed. Upon recrystallization from methyl Cellosolve a compound having the formula

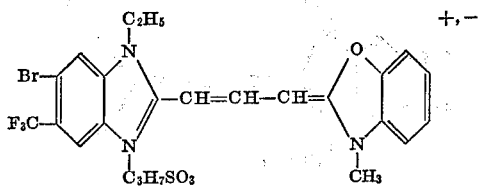

was recovered.

EXAMPLE 52

The procedure of Example 40 was repeated with the exception that in lieu of 2-anilinovinyl-3-ethyl-thiazolinium iodide, 2-acetanilinovinyl-6-chloro-3-methylbenzoxazolium iodide was employed. Upon recrystallization from methyl Cellosolve a compound having the formula

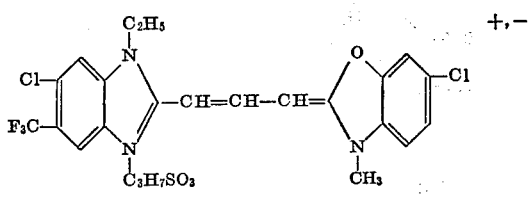

was recovered.

EXAMPLE 53

The procedure of Example 52 was repeated with the exception that in lieu of 2-acetanilinovinyl-6-chloro-3-methyl-benzoxazolium iodide, 2-acetanilinovinyl-3,5,6-trimethyl-benzoxazolium iodide was employed. Upon recrystallization from pyridine a compound having the formula

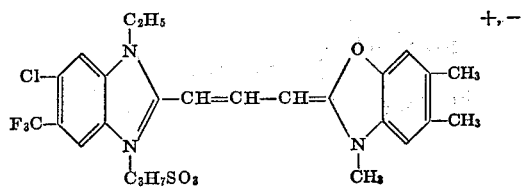

was recovered.

EXAMPLE 54

The procedure of Example 49 was repeated with the exception that in lieu of 2-anilinovinyl-3-ethyl-thiazolinium iodide, 2-acetanilinovinyl 5,6-dimethyl,3-ethyl-benzoxazolium iodide was employed. Upon recrystallization from methyl alcohol a compound having the formula

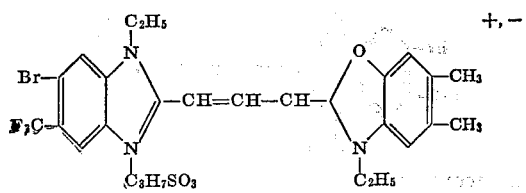

The absorption peaks of the dyestuffs of Examples 40 through 54 are set forth in the following table:

TABLE 4

| Example No. | λ max (MeOH), nm. |
|---|---|
| 40 | 473 |
| 41 | 471 |
| 42 | 487 |
| 43 | 497 |
| 44 | 482 |
| 45 | 480 |
| 46 | 480 |
| 47 | 471 |
| 48 | 488 |
| 49 | 474 |
| 50 | 471 |
| 51 | 487 |
| 52 | 488 |
| 53 | 496 |
| 54 | 497 |

Figure 2:
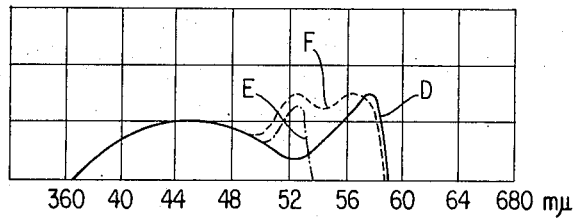
Figure 3:
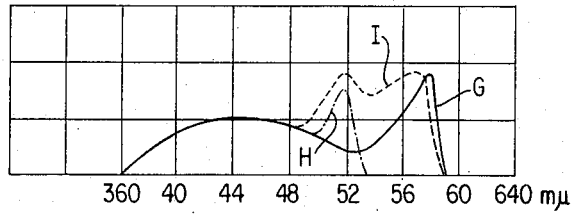

According to the present invention the dyes produced by Examples 6 through 11 are combined with the dyes of Examples 19 through 39 or of Examples 40 through 54. By thus combining these dyes in a photographic emulsion a sensitization which is sharply distinguishable is obtained. This type of sensitization is valuable since it results in sharp cut-offs in the sensitization of magenta layers to the green. These dyes were incorporated in emulsions according to this invention and gave representative curves as shown in FIGS. 1 through 3. Each of the drawings represents the sensitization curve of individual dyestuffs utilized in the present invention and of the combination of such dyes.

In FIG. 1, curve A represents the sensitivity of a gelatino-silver halide emulsion containing 2-[3-(6-chloro-1-ethyl-5-trifluoromethyl - 3 - sulfopropyl-2-benzimidazolylidene)-propenyl]-6-chloro - 1 - ethyl-5-trifluoromethyl-3-sulfopropylbenzimidazolium inner salt. Curve B represents the sensitivity of the same emulsion containing 2-[6-methyl-3-sulfopropyl - 2 - benzoselenazolylidene]-methylene-1-ethyl-6-methyl-quinolinium inner salt. Finally, Curve C represents the same emulsion containing a combination of 2-[3-(6-chloro-1-ethyl-5-trifluoromethyl-3-sulfopropyl-2 - benzimidazolylidene)-propenyl]-6-chloro-1-ethyl-5-trifluoromethyl - 3 - sulfopropyl-benzimidazolium inner salt and 2-(6-methyl-3-sulfopropyl-2-benzoselenazolylidene)-methylene-1-ethyl-6-methyl-quinolinium inner salt. According to the present invention it is clear that the combination of dyes according to the present invention provides an unexpected double peak sensitization of the emulsion.

In FIG. 2, Curve D represents the sensitivity of an ordinary gelatino-silver halide emulsion containing 2-[3-(6-chloro-1-ethyl-5-trifluoromethyl - 3 - sulfopropyl-2-benzimidazolylidene) - propenyl]-6-chloro-1-ethyl-5-trifluoromethyl-3-sulfopropyl-benzimidazolium inner salt. Curve E represents the same emulsion containing 2-[3-(1-ethyl-5-trifluoromethyl-3-sulfopropyl-2-benzimidazolylidene) propenyl]-3-methyl-benzoxazolium inner salt. Curve F represents the same emulsion with a combination of 2-[3-6 - chloro-1-ethyl-5-trifluoromethyl-3-sulfopropyl-2-benzimidazolylidene)propenyl]-6-chloro - 1 - ethyl-5-trifluoromethyl-3-sulfopropyl-benzimidazolium inner salt plus 2-[3 - (1-ethyl-5-trifluoromethyl-3-sulfopropyl-2-benzimidazolylidene)propenyl]-3-methyl-benzoxazolium inner salt, showing the double peak sensitization of the present invention.

In FIG. 3, Curve G represents the sensitivity of an ordinary gelatino-silver halide emulsion containing 2-[3-(6 - chloro-1-ethyl-5-trifluoromethyl-3-sulfopropyl-2-benzimidazolylidene)propenyl]-6-chloro - 1 - ethyl-5-trifluoromethyl-3-sulfopropyl-benzimidazolium inner salt. Curve H represents the same emulsion containing 2-[3-(6-chloro-1-ethyl-5-trifluoromethyl - 3 - sulfopropyl-2-benzimidazolylidene) - propenyl]-3-ethyl - thiazolinium inner salt. Curve I represents the same emulsion with a combination of 2-[3 - (6-chloro-1-ethyl-5-trifluoromethyl-3-sulfopropyl-2-benzimidazolylidene) - propenyl]-6-chloro-1-ethyl-5-trifluoromethyl-3-sulfopropyl-benzimidazolium inner salt plus 2-[3-(6-chloro-1-ethyl-5-trifluoromethyl-3-sulfopropyl - 2 - benzimidazolylidene)-propenyl]-3-ethyl-thiazolinium inner salt showing the double peak sensitization of the present invention.

Figure 4:
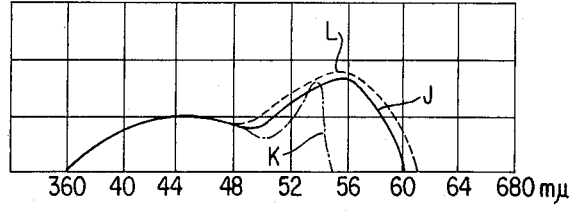

In FIG. 4, Curve J represents the sensitivity of an ordinary gelatino-silver halide emulsion containing 2-(3-carboxymethyl-5-chloro - 2 - benzoselenazolylidene)methylene-1-ethyl-6-methoxy-quinolinium iodide. Curve K represents the same emulsion containing 2-(6-methyl-3-sulfopropyl - 2 - benzoselenazolylidene)methylene - 1 - ethyl-6-methyl-quinolinium inner salt. Curve L represents the same emulsion with a combination of 2-(3-carboxy-methyl-5-chloro - 2 - benzoselenazolylidene)methylene-1-ethyl-6-methoxy-quinolinium iodide plus 2-(6-methyl-3-sulfopropyl - 2 - benzoselenazolylidene)methylene - 1 - ethyl-6-methyl-quinolinium inner salt showing the absence of double peak sensitization. Thus, FIG. 4 can be compared with FIG. 1.

What is claimed is:

1. A light sensitive silver halide photographic emulsion containing a composition comprising:

(a) a dye having the formula

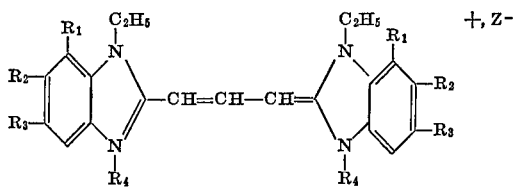

wherein $R_1$ and $R_2$ are each selected from the group consisting of hydrogen, alkyl, alkoxy, halogen, carboxyalkyl, and cyano, groups and combinations thereof, $R_3$ is a trifluoromethyl group, $R_4$ is selected from the group consisting of carboxyalkyl and sulfoalkyl radicals, and $Z^-$ is the appropriate anion corresponding to $R_4$; and (b) a dye seleceted from the group consisting of (1)

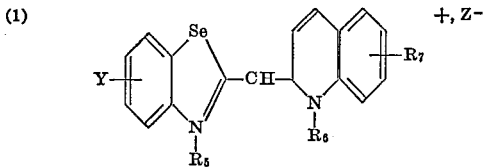

wherein $R_5$ is selected from the group consisting of carboxyalkyl and sulfoalkyl radicals, $R_6$ is selected from the group consisting of alkyl and aralkyl groups, $R_7$ is selected from the group consisting of halogens and alkyl groups, and Z is the appropriate anion corresponding to $R_5$; and (2)

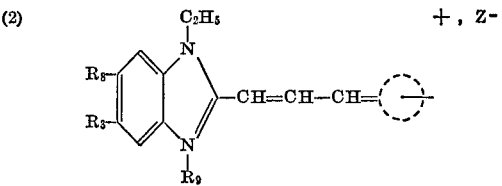

wherein T is a radical selected from the group consisting of

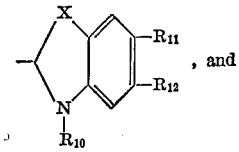, and

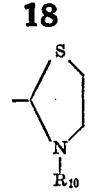

and wherein $R_8$ is selected from the group consisting of hydrogen, halogen and cyano radicals, $R_9$ is a sulfoalkyl radical, $R_{10}$ is a lower alkyl group, $R_{11}$ and $R_{12}$ are each selected from the group consisting of hydrogen, halogen, and lower alkyl groups, X is selected from the group consisting of oxygen and sulfur, Z is the appropriate anion corresponding to $R_9$, and $R_3$ is as hereinabove defined.

2. The emulsion of claim 1, wherein $R_1$ is hydrogen, $R_2$ is halogen, and $R_4$ is selected from the group consisting of carboxyethyl and sulfopropyl.

3. The emulsion of claim 2, wherein $R_2$ represents chlorine and $R_4$ represents carboxyethyl.

4. The emulsion of claim 2, wherein $R_2$ represents chlorine and $R_4$ represents sulfopropyl.

5. The emulsion of claim 2, wherein $R_2$ represents bromine and $R_4$ represents carboxyethyl.

6. The emulsion of claim 2, wherein $R_2$ represents bromine and $R_4$ represents sulfopropyl.

7. The emulsion of claim 1, wherein dyestuff (b) has Formula 1 and wherein $R_5$ is selected from the group consisting of carboxymethyl, carboxyethyl and sulfopropyl, $R_6$ is selected from the group consisting of ethyl and benzyl groups, $R_7$ is selected from the group consisting of hydrogen, methyl and methoxy groups, and Y is selected from the group consisting of chlorine and methyl radicals.

8. The emulsion of claim 7, wherein Y represents 5-chloro, $R_5$ represents carboxymethyl, $R_6$ represents ethyl, and $R_7$ represents 6 methoxy.

9. The emulsion of claim 7, wherein Y represents 5-chloro, $R_5$ represents carboxymethyl, $R_6$ represents ethyl, and $R_7$ represents 6-methyl.

10. The emulsion of claim 7, wherein Y represents 5-chloro, $R_5$ represents carboxyethyl, $R_6$ represents benzyl, and $R_7$ represents 6-methoxy.

11. The emulsion of claim 7, wherein Y represents 5-chloro, $R_5$ represents carboxyethyl, $R_6$ represents ethyl and $R_7$ represents hydrogen.

12. The emulsion of claim 7, wherein Y represents 5-chloro, $R_5$ represents carboxyethyl, $R_6$ represents ethyl, and $R_7$ represents 6-methyl.

13. The emulsion of claim 7, wherein Y represents 5-chloro, $R_5$ represents sulfopropyl, $R_6$ represents ethyl, and $R_7$ represents 6-methyl.

14. The emulsion of claim 7, wherein Y represents 5-chloro, $R_5$ represents sulfopropyl, $R_6$ represents benzyl, and $R_7$ represents 6-methoxy.

15. The emulsion of claim 7, wherein Y represents 6-chloro, $R_5$ represents sulfopropyl, $R_6$ represents ethyl, and $R_7$ represents 6-methyl.

16. The emulsion of claim 7, wherein Y represents 6-chloro, $R_5$ represents sulfopropyl, $R_6$ represents benzyl, and $R_7$ represents methoxy.

17. The emulsion of claim 7, wherein Y represents 6-chloro, $R_5$ represents carboxyethyl, $R_6$ represents ethyl, and $R_7$ represents 6-methyl.

18. The emulsion of claim 7, wherein Y represents 6-chloro, $R_5$ represents carboxyethyl, $R_6$ represents ethyl, and $R_7$ represents methoxy.

19. The emulsion of claim 7, wherein Y represents 6-methyl, $R_5$ represents carboxyethyl, $R_6$ represents benzyl, and $R_7$ represents 6-methoxy.

20. The emulsion of claim 7, wherein Y represents 6-methyl, $R_5$ represents carboxyethyl, $R_6$ represents ethyl, and $R_7$ represents 6-methyl.

21. The emulsion of claim 7, wherein Y represents 6-methyl, $R_5$ represents sulfopropyl, $R_6$ represents ethyl, and $R_7$ represents 6-methoxy.

22. The emulsion of claim 7, wherein Y represents 6-methyl, $R_5$ represents sulfopropyl, $R_6$ represents 6-methyl.

23. The emulsion of claim 7, wherein Y represents 6-methyl, $R_5$ represents sulfopropyl, $R_6$ represents benzyl, and $R_7$ represents 6-methoxy.

24. The emulsion of claim 7, wherein Y represents 7-methyl, $R_5$ represents sulfopropyl, $R_6$ represents benzyl, and $R_7$ represents 6-methoxy.

25. The emulsion of claim 7, wherein Y represents 7-methyl, $R_5$ represents sulfopropyl, $R_6$ represents ethyl, and $R_7$ represents 6-methoxy.

26. The emulsion of claim 7, wherein Y represents 7-methyl, $R_5$ represents sulfopropyl, $R_6$ represents ethyl, and $R_7$ represents 6-methyl.

27. The emulsion of claim 7, wherein Y represents 7-methyl, $R_5$ represents carboxymethyl, $R_6$ represents benzyl, and $R_7$ represents 6-methoxy.

28. The emulsion of claim 7, wherein Y represents 7-methyl, $R_5$ represents carboxyethyl, $R_6$ represents ethyl, and $R_7$ represents 6-methyl.

29. The emulsion of claim 1, wherein dyestuff (b) has formula (2) and wherein $R_9$ is a sulfopropyl radical, and $R_{10}$ is selected from the group consisting of methyl and ethyl groups.

30. The emulsion of Claim 29, wherein T represents

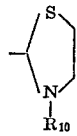

31. The emulsion of claim 30, wherein $R_8$ represents chloro and $R_{10}$ represents ethyl.

32. The emulsion of claim 30, wherein $R_8$ represents cyano and $R_{10}$ represents methyl.

33. The emulsion of claim 30, wherein $R_8$ represents brom and $R_{10}$ represents ethyl.

34. The emulsion of claim 29, wherein T represents

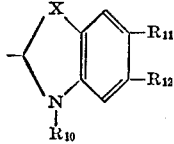

35. The emulsion of claim 34, wherein X represents oxygen, $R_8$ represents chlorine, $R_{10}$ represents methyl and $R_{11}$ and $R_{12}$ represent hydrogen.

36. The emulsion of claim 34, wherein X represents oxygen, $R_8$ represents chlorine, $R_{10}$ represents ethyl and $R_{11}$ and $R_{12}$ represent hydrogen.

37. The emulsion of claim 34, wherein $R_8$ represents chlorine, $R_{10}$ represents ethyl, $R_{11}$ and $R_{12}$ represent methyl.

38. The emulsion of claim 34, wherein $R_8$ represents hydrogen, $R_{10}$ represents ethyl, and $R_{11}$ and $R_{12}$ represent hydrogen.

39. The emulsion of claim 34, wherein $R_8$ represents hydrogen, $R_{10}$ represents methyl, $R_{11}$ and $R_{12}$ represent hydrogen.

40. The emulsion of claim 34, wherein $R_8$ represents cyano, $R_{10}$ represents methyl, $R_{11}$ and $R_{12}$ represent hydrogen.

41. The emulsion of claim 34, wherein $R_8$ represents bromo, $R_{10}$ represents methyl, $R_{11}$ and $R_{12}$ represents hydrogen.

42. The emulsion of claim 34, wherein $R_8$ represents chloro, $R_{10}$ represents methyl, $R_{11}$ represents chloro and $R_{12}$ represents hydrogen.

43. The emulsion of claim 1, comprising the dye 2-[3-(6 - chloro - 1 - ethyl-5-trifluoromethyl-3-sulfopropyl-2-benzimidizolylidene)-propenyl] - 6 - chloro-1-ethyl-5-trifluoromethyl-3-sulfopropyl-benzimidizolium inner salt.

44. The emulsion of claim 37, further comprising the dye 2-[6 - methyl - 3 - sulfopropyl-2-benzoselenazolylidene]-methylene-1-ethyl-6-methyl-quinolinium inner salt.

45. The emulsion of claim 37, further comprising the dye 2-[3 - (1 - ethyl-5-trifluoromethyl-3-sulfopropyl-2-benzimidazolidene) - propenyl] - 3 - methyl-1-benzoxazolium inner salt.

46. The emulsion of claim 37, further comprising the dye 2-[3 - (6 - chloro-1-ethyl-5-trifluoromethyl-3-sulfopropyl-2-benzimidazolylidene) - propenyl]-3-ethyl-thiazolinium inner salt.

References Cited

UNITED STATES PATENTS

| | | | |
|---|---|---|---|
| 2,159,037 | 5/1939 | Mees | 96—124 |
| 2,166,938 | 7/1939 | Carroll | 96—124 |
| 3,348,949 | 10/1967 | Bannert et al. | 96—124 |
| 3,617,294 | 11/1971 | Shiba et al. | 96—124 |

J. TRAVIS BROWN, Primary Examiner

U.S. Cl. X.R.

96—132, 137

PO-1050
(5/69)

UNITED STATES PATENT OFFICE
CERTIFICATE OF CORRECTION

Patent No. 3,794,498                    Dated February 26, 1974

Inventor(s)  Shi-Kuang Yao

It is certified that error appears in the above-identified patent
and that said Letters Patent are hereby corrected as shown below:

Column 1, line 21,    for "substittued", read -- substituted--;
Column 2, line 63,    for "hyodrgen", read --hydrogen--;

Column 2, line 17,    for "effected", read --affected--;

Column 6,
        line 61,      for "magneta", read --magenta--;

Claim 22, line 2,     for "$R_6$", read --$R_6$ represents ethyl, and $R_7$--;

Claim 33, line 2,     for "brom", read --bromo--.

Signed and sealed this 10th day of September 1974.

(SEAL)
Attest:

McCOY M. GIBSON, JR.                    C. MARSHALL DANN
Attesting Officer                        Commissioner of Patents